United States Patent
Takeyama (10) Patent No.: US 9,166,234 B2
(45) Date of Patent: Oct. 20, 2015

(54) FUEL CELL SYSTEM

(75) Inventor: Makoto Takeyama, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 155 days.

(21) Appl. No.: 13/642,015

(22) PCT Filed: Jun. 28, 2011

(86) PCT No.: PCT/JP2011/064787
§ 371 (c)(1),
(2), (4) Date: Oct. 18, 2012

(87) PCT Pub. No.: WO2013/001603
PCT Pub. Date: Jan. 3, 2013

(65) Prior Publication Data
US 2013/0295491 A1    Nov. 7, 2013

(51) Int. Cl.
*H01M 8/04* (2006.01)
*H01M 8/02* (2006.01)

(52) U.S. Cl.
CPC ........ *H01M 8/04201* (2013.01); *H01M 8/0228* (2013.01); *H01M 8/04089* (2013.01); *H01M 8/0206* (2013.01); *H01M 8/0221* (2013.01); *Y02E 60/50* (2013.01)

(58) Field of Classification Search
CPC ............... H01M 8/04201; H01M 8/04089; H01M 8/0206; H01M 8/0228; H01M 8/0221; Y02E 60/50
USPC .......................................... 429/513, 515, 505
See application file for complete search history.

(56) References Cited

U.S. PATENT DOCUMENTS

| | | |
|---|---|---|
| 2003/0194596 A1 | 10/2003 | Ye et al. |
| 2008/0057372 A1* | 3/2008 | Sommer et al. ................. 429/34 |
| 2010/0209797 A1* | 8/2010 | Katano et al. ................. 429/454 |

FOREIGN PATENT DOCUMENTS

| | | |
|---|---|---|
| CN | 101536233 A | 9/2009 |
| JP | 2001-143734 A | 5/2001 |
| JP | 2006-221915 A | 8/2006 |
| JP | 2008-130446 A | 6/2008 |
| JP | 2010-054035 A | 3/2010 |
| JP | 2010-267551 A | 11/2010 |

OTHER PUBLICATIONS

International Search Report & Written Opinion of PCT/JP2011/064787 mailed Oct. 18, 2011.

* cited by examiner

*Primary Examiner* — Jonathan Jelsma
*Assistant Examiner* — Omar Kekia
(74) *Attorney, Agent, or Firm* — Kenyon & Kenyon LLP (57) ABSTRACT

Disclosed is a fuel cell system in which a hydrogen distribution system is configured in a compact size. High-pressure hydrogen gas from a hydrogen tank is decompressed in an injector and is then supplied to a cell stack manifold. A portion of a high-pressure supply system on the upstream side of the injector is formed as a first within-end-plate flow passage, and a portion of a low-pressure supply system on the downstream side of the injector is formed as a second within-end-plate flow passage. The second within-end-plate flow passage is a recess portion or a groove formed in the end plate and is formed as an open channel flow passage.

10 Claims, 6 Drawing Sheets

FUEL CELL SYSTEM

This is a 371 national phase application of PCT/JP2011/064787 filed 28 Jun. 2011, the contents of which are incorporated herein by reference.

TECHNICAL FIELD

The present invention relates to a fuel cell system, and more particularly to a supply system for fuel gas.

BACKGROUND ART

In fuel cells, which perform power generation through an electrochemical reaction between fuel gas and oxidizing gas, technology for achieving a compact structure of a piping system which supplies the fuel gas and the oxidizing gas has been proposed.

For example, the following Patent Literature 1 discloses a structure in a fuel cell system including fuel cell stacks, an end plate to which the fuel cell stacks are fixed, hydrogen system components (a hydrogen pump and a regulator, a vapor-liquid separator, distribution pipes, or the like) for supplying hydrogen gas to the fuel cell stacks, and a stack case for housing the fuel cell stacks and the hydrogen system components, in which the hydrogen system components are collected and mounted on the end plate. Specifically, a plate-like bracket extending in the plane direction of the end plate is attached to the end plate, and the hydrogen system components are mounted on the bracket.

PRIOR ART DOCUMENTS

Patent Literature

Patent Literature 1: JP 2006-221915 A

SUMMARY OF THE INVENTION

Technical Problems

The hydrogen gas is supplied from a hydrogen tank to an injector through piping (high-pressure piping), and after adjustment of the pressure in the injector, is supplied to the fuel cell stack through piping (low-pressure piping). Here, as the high-pressure hydrogen gas from the hydrogen tank is supplied to a regulator by passing through an auxiliary machine cover which covers the hydrogen system components or the housing case, a grommet (a toroidal rubber component used for sealing a space in the through portion) is required in this through portion for preventing entry of external water content. This makes it further difficult to reduce the size of the system and also leads to a problem that may cause an increase in costs.

The object of the present invention is to provide technology which makes it possible to construct a hydrogen gas supply system of a fuel cell system in a compact form.

Solution to Problems

The present invention is characterized by including a fuel cell stack which performs generation of power through an electrochemical reaction between hydrogen gas and oxidizing gas, an end plate which is provided on an end portion of the fuel cell stack in a stacking direction thereof, a high-pressure supply system which supplies high-pressure hydrogen gas supplied from a hydrogen tank, an injector which decompresses the high-pressure hydrogen gas supplied from the high-pressure supply system, and a low-pressure supply system which supplies low-pressure hydrogen gas supplied from the injector, wherein at least a portion of the low-pressure supply system is a within-end-plate flow passage formed within the end plate, the within-end-plate flow passage being a recess portion or a groove formed within the end plate.

According to the present invention, at least a portion of the low-pressure supply system is a within-end-plate flow passage formed within the end plate in the form of a recess portion or a groove, and therefore the low-pressure supply system is compact in size. Further, as the low-pressure supply system is formed by forming a recess portion or a groove within the end plate, productivity can be improved. In addition, as the within-end-plate flow passage is a low-pressure supply system, the thickness of the rib for forming the recess portion or the groove may be relatively thin.

Further, the present invention is characterized by including a fuel cell stack which performs generation of power through an electrochemical reaction between hydrogen gas and oxidizing gas, an end plate which is provided on an end portion of the fuel cell stack in a stacking direction thereof, a high-pressure supply system which supplies high-pressure hydrogen gas supplied from a hydrogen tank, an injector which decompresses the high-pressure hydrogen gas supplied from the high-pressure supply system, and a low-pressure supply system which supplies low-pressure hydrogen gas supplied from the injector, wherein at least a portion of the low-pressure supply system is a within-end-plate flow passage formed within the end plate, at least a portion of the high-pressure supply system includes distribution piping systems, and the injector is provided in each of the distribution piping systems.

According to the present invention, because at least a portion of the low-pressure supply system is formed within the end plate, the low-pressure supply system is compact in size. Further, by providing distribution piping systems in the high-pressure supply system and providing injectors in the respective distribution piping systems, redundancy of the decompressing system for the high-pressure hydrogen gas can be achieved, thereby increasing reliability.

Also, the present invention is characterized by including a fuel cell stack which performs generation of power through an electrochemical reaction between hydrogen gas and oxidizing gas, an end plate which is provided on an end portion of the fuel cell stack in a stacking direction thereof, a high-pressure supply system which supplies high-pressure hydrogen gas supplied from a hydrogen tank, an injector which decompresses the high-pressure hydrogen gas supplied from the high-pressure supply system, and a low-pressure supply system which supplies low-pressure hydrogen gas supplied from the injector, wherein at least a portion of the low-pressure supply system is a within-end-plate flow passage formed within the end plate, the within-end-plate flow passage is formed by covering a recess portion or a groove formed in the end plate with a cover, and the within-end-plate flow passage is formed in a region of the end plate which is not in contact with the fuel cell stack.

According to the present invention, because at least a portion of the low-pressure supply system is formed within the end plate, the low-pressure supply system is compact in size. Further, because the within-end-plate flow passage is formed in a region of the end plate which is not in contact with the fuel cell stack, it is possible to remove the cover to expose the within-end-plate flow passage in a state in which the end plate and the fuel cell stack are fixed with each other, so that ease of maintenance can be significantly improved.

Moreover, the present invention is characterized by including a fuel cell stack which performs generation of power through an electrochemical reaction between hydrogen gas and oxidizing gas, an end plate which is provided on an end portion of the fuel cell stack in a stacking direction thereof, a high-pressure supply system which supplies high-pressure hydrogen gas supplied from a hydrogen tank, an injector which decompresses the high-pressure hydrogen gas supplied from the high-pressure supply system, and a low-pressure supply system which supplies low-pressure hydrogen gas supplied from the injector, wherein at least a portion of the low-pressure supply system is a within-end-plate flow passage formed within the end plate, the within-end-plate flow passage forms a branched flow passage extending in a vertical direction, and a pressure sensor is provided at a leading end of a portion of the branched flow passage.

According to the present invention, because at least a portion of the low-pressure supply system is formed within the end plate, the low-pressure supply system is compact in size. Further, as the pressure sensor is provided at a leading end of the branched flow passage, even if foreign materials (water and ice, and dust) are mixed within the within-end-plate flow passage, adverse effects on the pressure sensor can be suppressed.

Furthermore, the present invention is characterized by including a fuel cell stack which performs generation of power through an electrochemical reaction between hydrogen gas and oxidizing gas, an end plate which is provided on an end portion of the fuel cell stack in a stacking direction thereof, a high-pressure supply system which supplies high-pressure hydrogen gas supplied from a hydrogen tank, an injector which decompresses the high-pressure hydrogen gas supplied from the high-pressure supply system, and a low-pressure supply system which supplies low-pressure hydrogen gas supplied from the injector, wherein at least a portion of the high-pressure supply system is a first within-end-plate flow passage formed within the end plate, at least a portion of the low-pressure supply system is a second within-end-plate flow passage formed within the end plate, an inlet port of the first within-end-plate flow passage is formed on one side surface of the end plate, and high-pressure hydrogen flowing out of an outlet port of the first within-end-plate flow passage is supplied to an inlet side of the injector.

According to the present invention, because at least a portion of the high-pressure supply system and at least a portion of the low-pressure supply system are formed within the end plate, the high-pressure supply system and the low-pressure supply system are compact in size. Further, because the first within-end-plate flow passage of the high-pressure supply system has an inlet port on one side surface of the end plate, the high-pressure hydrogen gas supplied from the hydrogen tank can flow into the end plate from the side surface of the end plate without the need to pass through an auxiliary machine cover covering the auxiliary machines provided in the end plate, which eliminates the need for providing a protecting grommet or the like.

Advantageous Effects of Invention

According to the present invention, it is possible to construct the hydrogen gas supply system of a fuel cell system in a compact form. In particular, as a portion of the low-pressure supply system is formed within the end plate, it is possible to achieve a compact structure while retaining the strength of the low-pressure supply system.

BEST MODE FOR CARRYING OUT THE INVENTION

A preferred embodiment of the present invention will be described with reference to the drawings.

First, the overall structure of a hydrogen gas supply system (anode-side supply system) of a fuel cell system will be described.

A fuel cell (FC) includes a fuel cell stack formed by stacking a plurality of unit cells that receive supply of reaction gas and generate electric power through an electrochemical reaction, an end plate (EP) provided on an end portion of this fuel cell stack in the stacking direction, and a cell stack manifold.

High-pressure hydrogen gas from a hydrogen tank is supplied to the end plate via a regulator. The end plate includes a plurality of, e.g. three, injectors arranged in parallel to each other. Low-pressure hydrogen gas ejected from the three injectors is supplied to the fuel cell. As the upstream side of the injectors is at a relatively high pressure, and the downstream side of the injectors is at a relatively low pressure, the upstream side of the injector will be referred to as a "high-pressure system" and the downstream side of the injector will be referred to as a "low-pressure system."

Off-gas from the fuel cell is supplied to a vapor-liquid separator, which separates water content from the off-gas and supplies a portion of the off-gas to the hydrogen pump for circulation. The off-gas containing water content and impurities is discharged via a purge valve to discharge piping.

Figure 1:
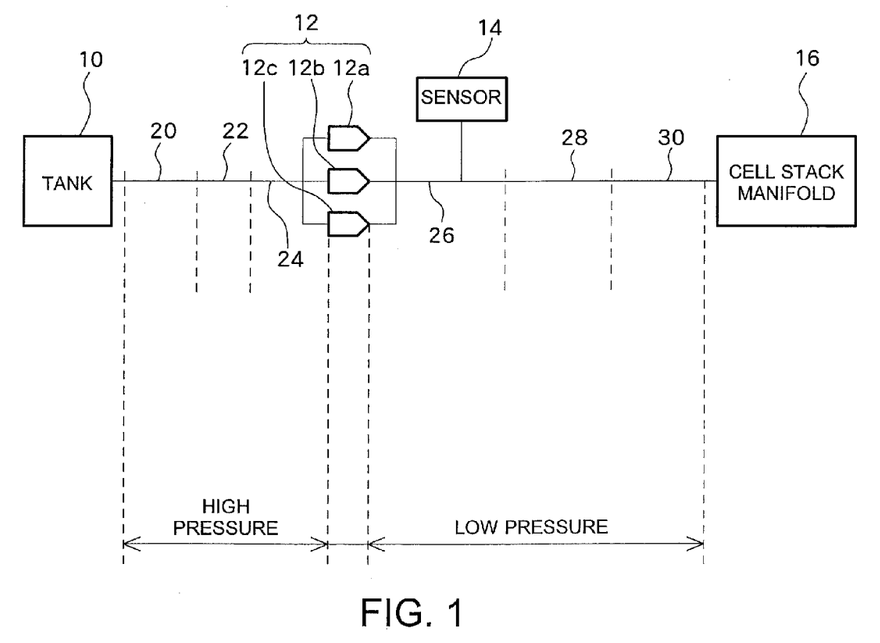
FIG. 1 View illustrating the structure of a hydrogen gas supply system of a fuel cell system.

FIG. 1 schematically illustrates the hydrogen gas supply system according to the present embodiment. High-pressure hydrogen gas from a hydrogen tank 10 is supplied via a high-pressure supply system to an injector 12. The high-pressure supply system is composed of a piping unit 20 formed of an elastic member such as a hose, a first within-end-plate flow passage 22, and distribution piping (delivery piping) 24. Whereas the piping unit 20 and the distribution piping 24 are provided outside the end plate, the first within-end-plate flow passage 22 is provided within the end plate, as the term indicates.

The injector 12 is composed of three injectors 12a, 12b, and 12c. Because the structure and the function of the injector is known, only brief description thereof will be provided. Each of the injectors 12a, 12b, and 12c is provided with a valve element, and, with energization to a solenoid, the valve element is driven to change the opening state of the inner flow passage. In the non-energized state of the solenoid, the valve element is in contact with a valve seat opposing the valve element by means of an urging force of a spring, thereby closing the inner flow passage. When the solenoid is placed in an energized state, the valve element moves away from the valve seat against the urging force of the spring, thereby placing the inner flow passage in an open state. The solenoid is energized based on a control signal from a controller which is not illustrated, to control the gas injection time and the gas injection time period of the injectors 12a, 12b, and 12c, thereby controlling the flow rate and the pressure of the hydrogen gas with high precision. As the pressure of the downstream side of the injectors 12a, 12b, and 12c is reduced compared to that on the upstream side, the injectors 12a, 12b, and 12c can be referred to as pressure adjustment valves.

Low-pressure hydrogen gas from the injectors 12a, 12b, and 12c is supplied via a low-pressure supply system, to a cell stack manifold 16 of the fuel cell. The low-pressure supply system is composed of a second within-end-plate flow passage 26, a piping unit 28 formed of an elastic member such as a hose, and a third within-end-plate flow passage 30. Whereas the piping 28 is provided outside the end plate, the second within-end-plate flow passage 26 and the third within-end-plate flow passage 30 are provided within the end plate, as the terms indicate. A pressure sensor 14 is provided in the second within-end-plate flow passage 26 to detect the pressure of the low pressure hydrogen gas, which is then supplied to the controller.

In the present embodiment, a portion of the high pressure supply system is provided within the end plate, and a portion of the low pressure supply system is similarly provided within the end plate. By providing a portion of the high pressure supply system within the end plate, it is possible not only to reduce the size of the piping system but also to cause the high-pressure hydrogen from the hydrogen tank to flow into the end plate before being supplied to the injector 12, which can eliminate the necessity of providing a grommet in the portion of the auxiliary machine cover through which the external piping passes, which has been required in prior art in which high pressure hydrogen gas is supplied from the hydrogen tank to the injector through the external piping. Also, by providing a portion of the low pressure supply system within the end plate, it is possible not only to reduce the size of the piping system but also to secure the strength of the low pressure piping system.

The structure of the end plate according to the present embodiment will be now described.

Figure 2:
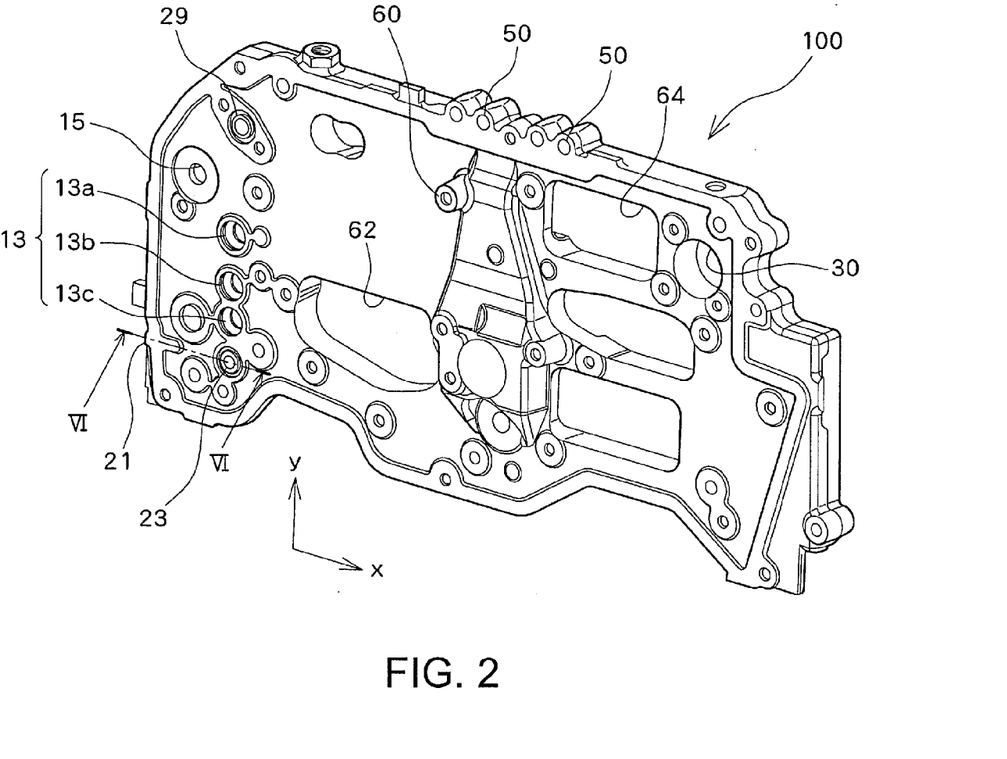
FIG. 2 Perspective view illustrating the outer appearance (front side) of an end plate.
Figure 3:
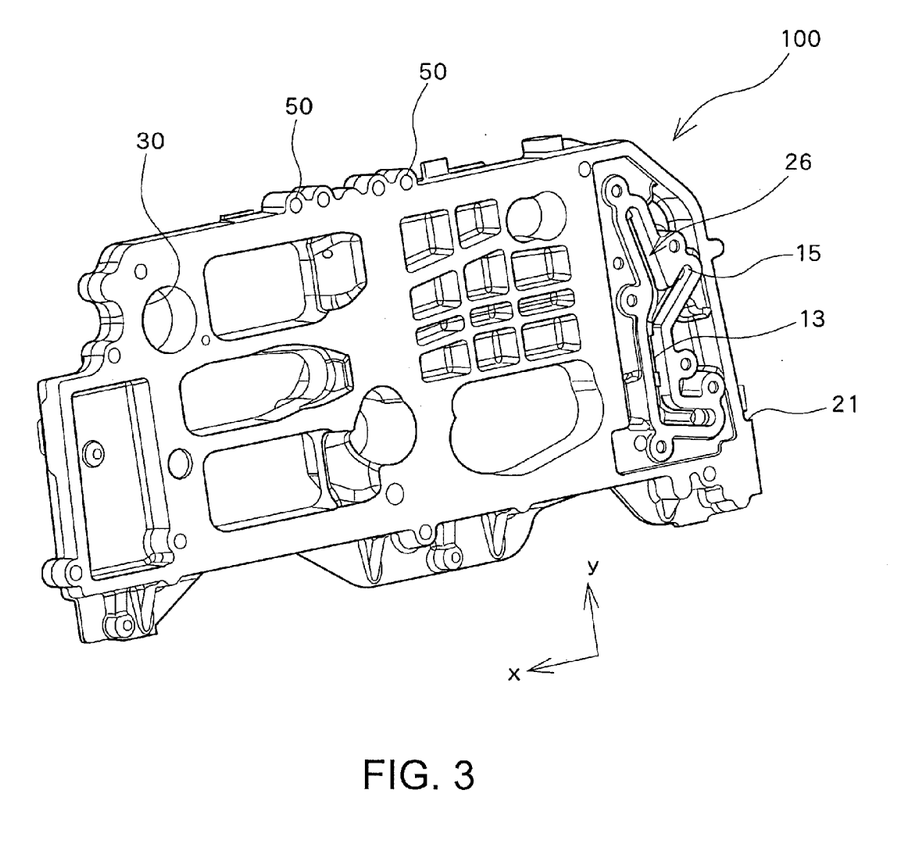
FIG. 3 Perspective view illustrating the outer appearance (back side) of an end plate.

FIGS. 2 and 3 are perspective views illustrating the outer appearance of the end plate according to the present embodiment. Specifically, FIG. 2 is a perspective view illustrating the outer appearance of the front side of the end plate 100; that is, a side seen from the opposite side of the fuel cell stack, and FIG. 3 is a perspective view illustrating the outer appearance of the rear side of the end plate 100; that is, a side seen from the fuel cell stack side.

The end plate 100 is in a shape of a flat plate and is formed of aluminum or a like material which is suitable for casting. The end plate 100 is fixed to a housing case which houses the fuel cell stack by means of bolting. Here, bolts are inserted into bolt holes 50 provided in the upper middle portion of the end plate 100.

At a predetermined position of the end plate 100; more specifically, at a position which is shifted in the horizontal direction (i.e. x-direction in the figure) with respect to the center portion of the end plate 100, holes 13 for injectors are formed. Specifically, the injector holes 13 include three holes 13a, 13b, and 13c arranged in the vertical direction (i.e. y-direction in the figure). These three injector holes 13a, 13b, and 13c correspond to the three injectors 12a, 12b, and 12c, respectively, which are illustrated in FIG. 1. More specifically, the injector 12a is mounted in the injector hole 13a, the injector 12b is mounted in the injector hole 13b, and the injector 12c is mounted in the injector hole 13c. The outlet sides of the injectors 12a to 12c are mounted in the injector holes 13a to 13c, respectively.

A hole 15 for pressure sensor is formed near the injector holes 13 on the end plate 100. Specifically, the pressure sensor hole 15 is formed at a position above the injector holes 13. The pressure sensor hole 15 corresponds to the pressure sensor 14 illustrated in FIG. 1. The pressure sensor 14 is mounted in the pressure sensor hole 15.

An inlet port 21 for high-pressure hydrogen gas is formed on one side surface of the end plate 100. The high-pressure hydrogen gas from the hydrogen tank flows in through this inlet port 21 and is supplied into the first within-end plate flow passage 22.

A high-pressure hydrogen outlet port 23 is formed near the injector holes 13 on the end plate 100; more specifically, at a position below the injector hole 13. The high-pressure hydrogen flowing through the first within-end-plate flow passage 22 flows to the outside of the end plate 100 through this outlet port 23, and is supplied to the three injectors 12a, 12b, and 12c in a distributed manner via the distribution piping 24.

The third within-end-plate flow passage 30 is formed in the end plate 100 in the vicinity of an end portion on the side of the end plate 100 opposite the side where the injector hole 13 is formed. The low-pressure hydrogen gas from the injector 12 is supplied to the third within-end-plate flow passage 30 via the piping unit 28 provided outside of the end plate 100, and is then supplied to the fuel cell stack through this third within-end-plate flow passage 30. Further, various auxiliary machines such as a hydrogen pump, piping, and the like are attached to the end plate 100. More specifically, a hydrogen pump is to be attached to a hole 60 in the end plate 100, and a vapor-liquid separator is received in an opening portion 62 in the end plate 100. The hydrogen pump is a circulation pump which returns the off-gas from the fuel cell stack back into the fuel cell stack for reusing. Also, an opening portion 64 is configured to receive a valve assy which supplies air serving as oxidizing gas and also discharges air from the fuel stack. Further, an opening portion 66 is configured to receive outlet piping for a coolant which is supplied from the stack manifold to the fuel cell stack. In addition, an outlet port 29 and the third within-end-plate flow passage 30 are connected by means of piping, which is also attached to the end plate 100 and forms the piping unit 28.

Meanwhile, the second within-end-plate flow passage 26 is formed on the rear surface side of the end plate 100, as illustrated in FIG. 3. The second within-end-plate flow passage 26 is a recess portion or a groove formed in the end plate 100 and is an open channel flow passage having a portion of a surface thereof being exposed. The second within-end-plate flow passage 26 has an outer appearance of a branched shape as illustrated in FIG. 3, and the injector hole 13 described above is formed in a portion of the second within-end-plate flow passage 26.

Figure 4:
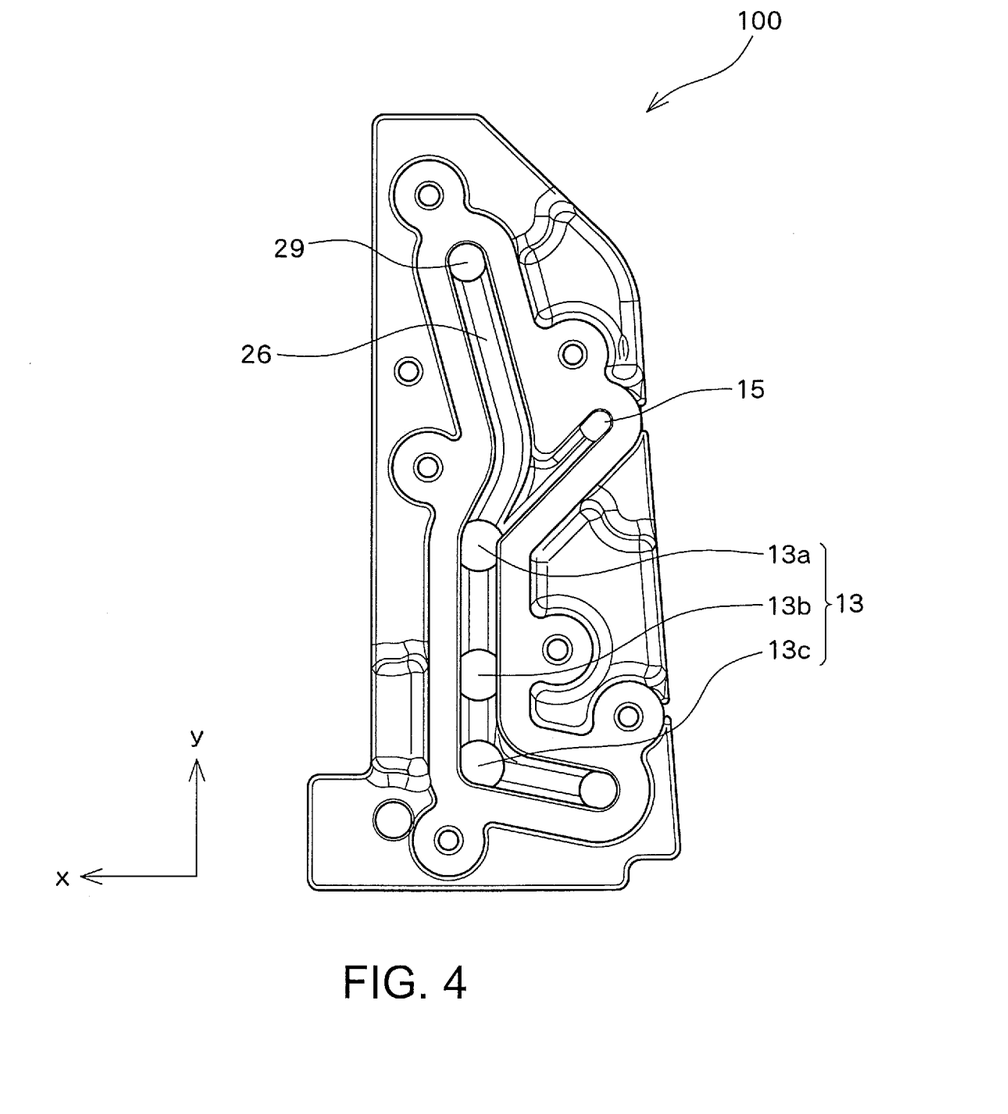
FIG. 4 Partial enlarged plan view of FIG. 3.

FIG. 4 illustrates a partial enlarged plan view including the second within-end-plate flow passage 26. The second within-end-plate flow passage 26 extends in a branched shape in the vertical direction (the y-direction in the figure). The three injector holes 13a, 13b, and 13c are arranged in the vertical direction along the second within-end-plate flow passage 26. Further, the pressure sensor hole 15 is formed at the leading end portion of one of branches of the second within-end-plate flow passage 26; more specifically, at the leading end portion of a branch located above the injector hole 13, and the pressure sensor 14 is mounted here. As the pressure sensor 14 is mounted at an upper portion of the second within-end-plate flow passage 26; i.e., at a high level, failure of the pressure sensor 14 caused by freezing of dew drops or the like can be prevented in advance. Further, the outlet port 29 is formed at the upper end of the second within-end-plate flow passage 26. The low-pressure hydrogen gas from the injectors 12 is merged in the second within-end-plate flow passage 26 before flowing to the outside of the end plate once again through the outlet port 29.

By forming the second within-end-plate flow passage 26 within the end plate 100, it is possible to make use of the strength of the end plate 100 itself, to thereby secure the strength of the piping of the low-pressure system. More specifically, while, with the structure in which the low-pressure hydrogen gas from the injectors 12 is guided to the fuel cell stack via the piping system such as a hose, not only is the length of the piping increased but also problems concerning the strength arise, these problems can be solved by forming a portion of the low-pressure supply system within the end plate and using the end plate itself as the piping system.

Further, as the second within-end-plate flow passage 26 is a low-pressure system, it is possible to make the walls (ribs) which form the second within-end-plate flow passage 26 thinner than those in a high-pressure system.

Also, as the second within-end-plate flow passage 26 is an open-channel flow passage, a cover is required for coverage thereof. In this regard, the second within-end-plate flow passage 26, which is a low-pressure system, can secure a sealing property with respect to the cover more easily than in the case of a high-pressure system. As a matter of course, maintenance of the second within-end-plate flow passage 26 can be facilitated by removing the cover. Here, while the end plate 100 is formed of a metal such as aluminum which is easy to cast, the cover (end plate cover) can be formed of a resin. The end plate 100 and the cover are bonded to each other in a sealing manner by a sealing material. Here, it is desirable, in view of ease of machining, to provide a seal groove for containing the sealing material on the side of the cover rather than on the side of the end plate 100. More specifically, although forming the seal groove on the end plate 100 side requires mechanical machining, which leads to a reduction in productivity, forming the seal groove on the side of the cover formed of a resin is comparatively easy, thereby improving productivity.

The end plate 100 according to the present embodiment has such a structure as described above, in which the high-pressure hydrogen gas from the hydrogen tank flows into the first within-end-plate flow passage 22 via the piping 20 such as a hose, through the inlet port 21 formed on a side surface of the end plate 100.

The high-pressure hydrogen gas passing through the first within-end-plate flow passage 22 flows to the outside of the end plate through the outlet port 23 and flows into a distribution piping 24 external to the end plate. The distribution piping 24 distributes the stream of the high-pressure hydrogen gas into three streams. The injectors 12a, 12b, and 12c are provided in these three distributed flow passages, respectively. These three distributed flow passages constitute redundant systems with respect to each other. More specifically, even if one of these injectors fails, the remaining normal injectors can be used for decompressing the high-pressure hydrogen gas, so that reliability of the system can be maintained. As the outlet sides of the injectors 12a, 12b, and 12c are mounted in the injector holes 13a, 13b, and 13c in the end plate 100, respectively, the low-pressure hydrogen gas which has been decompressed by the injectors 12a, 12b, and 12c flows into the second within-end-plate flow passage 26.

The low-pressure hydrogen gas passing through the second within-end-plate flow passage flows to the outside of the end plate from the outlet port 29 formed in the upper portion of the second within-end-plate flow passage 26, and further flows into the third within-end-plate flow passage 30 via the piping system such as a hose. The low-pressure hydrogen gas flowing into the third within-end-plate flow passage 30 is supplied to the fuel cell stack through the interior of the end plate 100.

As described above, according to the present embodiment, because the first within-end-plate flow passage 22 is formed in a portion of the high-pressure supply system and the second within-end-plate flow passage 26 and the third within-end-plate flow passage 30 are formed in a portion of the low-pressure supply system, so that the end plate 100 is effectively used to constitute the supply passage of the hydrogen gas, it is possible to reduce the size of the piping system and simultaneously secure the strength thereof.

Further, as the high-pressure hydrogen gas from the hydrogen tank flows into the end plate 100 from one side surface of the end plate 100 and then flows out of the end plate 100 and is supplied to the injectors 12 through the distribution piping 24, it is not necessary to supply the high-pressure hydrogen gas to the injectors 12 through the cover for covering the auxiliary machines provided in the end plate 100, which further eliminates the need for providing a grommet for sealing the through portions. In other words, as it is not necessary to form a flow passage extending through the auxiliary machine cover, the fluid-tight property of the auxiliary machine cover can be enhanced.

Also, according to the present embodiment, the three injector holes 13a, 13b, and 13c are formed in the second within-end-plate flow passage 26 and the injectors 12a, 12b, and 12c are mounted in these holes, and the injectors 12a, 12b, and 12c are arranged in the vertical direction (i.e. the y direction in the figure and the normal direction). As such, as the injectors are provided at different levels, the possibility of simultaneous occurrence of failure in these three injectors 12a, 12b, and 12c can be eliminated, even if freezing of the water content occurs during a low-temperature period. (Even if freezing of the water content occurs during a low-temperature period, failure will occur sequentially in order starting from the injector 12c located at the lowermost level.)

Figure 5:
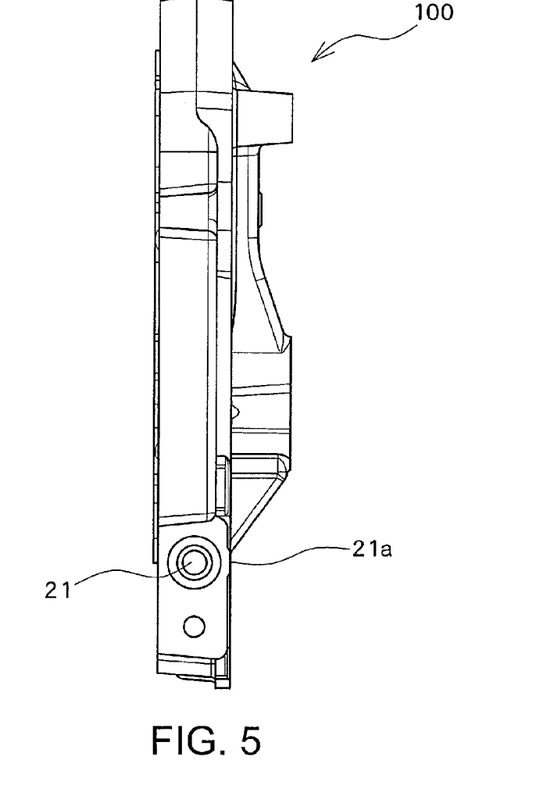
FIG. 5 Side view of the end plate.

FIG. 5 illustrates a side view of the end plate 100. The end plate 100 includes the inlet port 21 provided on one surface thereof, and the high-pressure hydrogen gas from the hydrogen tank flows into the first within-end-plate flow passage 22 from the inlet port 21. Here, because forming the inlet port 21 on the side surface of the end plate 100 raises a possibility that a thin-walled portion will be generated in the vicinity of the inlet port 21 and a variation of this thin-walled portion will lower the strength, it is desirable to form a projection portion 21a in which a portion near this thin-walled portion projects toward the front surface side of the end plate 100.

Figure 6:
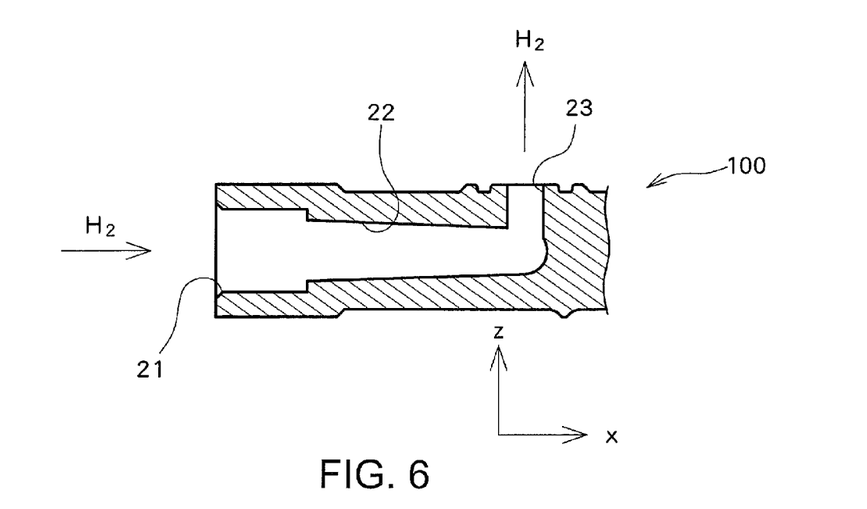
FIG. 6 Cross sectional view taken along line VI-VI in FIG. 2.

FIG. 6 illustrates a cross sectional view taken along line VI-VI in FIG. 2; specifically, a cross sectional view of the inlet port 21, the first within-end-plate flow passage 22, and the outlet port 23. The inlet port 21 formed on one side surface of the end plate 100 is connected to the first within-end-plate passage 22. The first within-end-plate passage 22 extends within the end plate 100 in the x direction in the figure, and is then bent to be connected to the outlet port 23 formed on the surface of the end plate 100. In the figure, the z direction indicates a direction of a normal line which is vertical to the surface of the end plate 100. While the first within-end-plate passage 22 extends in the x direction, the first within-end-plate passage 22 is simultaneously tapered such that the diameter thereof is gradually reduced from the inlet port 21 toward the outlet port 23. As the first within-end-plate passage 22 is a closed channel passage rather than an open channel passage; that is, as the first within-end-plate passage 22 is configured as a bore formed within the end plate 100, forming the first within-end-plate passage 22 in a tapered manner as described above results in advantages that the molding die can be easily pulled out and machining can be facilitated.

In the present embodiment, the second within-end-plate passage 26 is formed of an open channel flow passage, and the low-pressure hydrogen gas is allowed to flow within the end plate 100 by covering the second within-end-plate passage 26 with the cover. Here, by forming the second within-end-plate passage 26 in a region of the end plate 100 which is not in contact with the fuel cell stack, it is possible to remove the cover only, while maintaining a state in which the end plate 100 and the fuel stack are in contact with each other.

Figure 7:
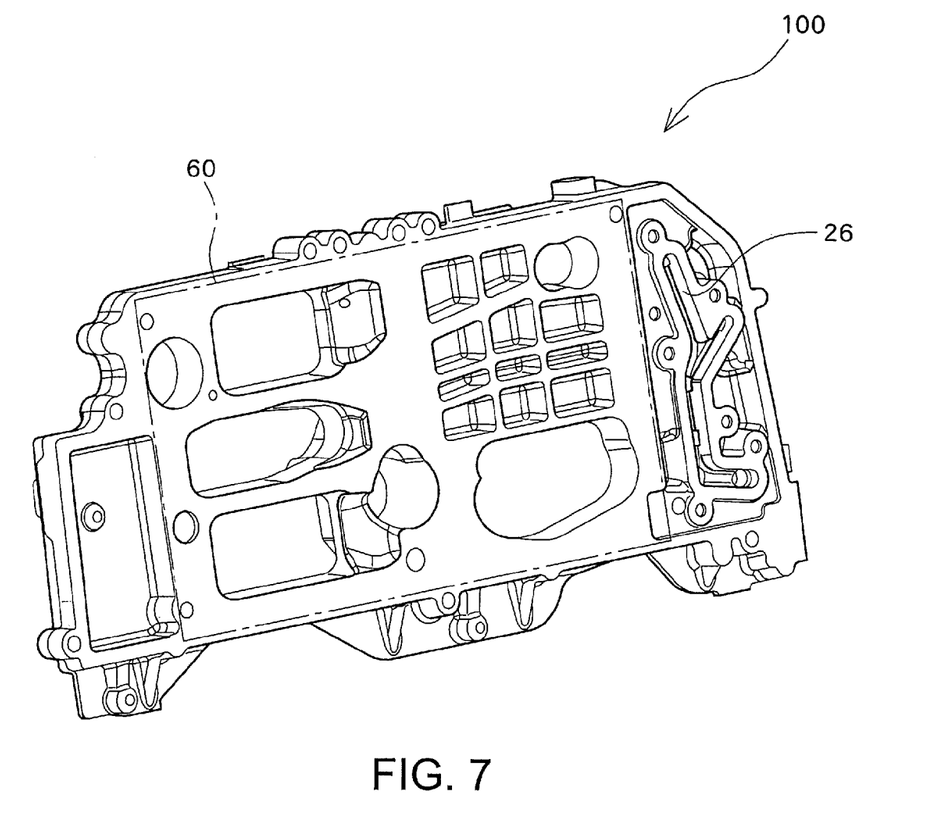
FIG. 7 Perspective view illustrating the outer appearance of a contact region between the end plate and the fuel cell stack.

FIG. 7 illustrates the contact region of the fuel cell stack, as a region 60, in a perspective view of the outer appearance of the end plate illustrated as in FIG. 3. By forming the end plate 100 so as to have an area larger than that of the fuel stack, when observed in the stacking direction of the fuel cell stack, an extra region which is not in contact with the fuel cell stack is formed in the end plate 100. The second within-end-plate passage 26 is formed in this extra region.

The end plate 100 is bolted to the fuel cell stack by means of the bolt holes 50. Even in the state in which the end plate 100 is bolted to the fuel cell stack and a bolting weight is applied to the end plate 100, the cover is externally exposed because the fuel cell stack is not in contact with the extra region of the end plate 100. Accordingly, even in this bolted state, it is possible to remove the cover easily to thereby expose the second within-end-plate passage 26 for maintenance.

While the embodiment of the present invention has been described, the present invention is not limited to this example and various modifications can be made.

For example, while in the above example there has been described a structure in which a plurality of injectors 12a, 12b, and 12c are provided, the number of injectors is arbitrary, and may be one, or four or more. Even when only one injector is provided, it is desirable to provide the pressure sensor 14 above the injector.

REFERENCE SYMBOLS LIST 10 hydrogen tank, 12 injector, 14 pressure sensor, 16 cell stack manifold, 20 piping unit, 22 first within-end-plate flow passage, 24 distribution piping, 26 second within-end-plate passage, 29 piping unit, 30 third within-end-plate passage.

The invention claimed is:

1. A fuel cell system, comprising:
a fuel cell stack which generates power through an electrochemical reaction between hydrogen gas and oxidizing gas;
an end plate which is provided on an end portion of the fuel cell stack in a stacking direction thereof;
a high-pressure supply system which supplies high-pressure hydrogen gas supplied from a hydrogen tank;
an injector which decompresses the high-pressure hydrogen gas supplied from the high-pressure supply system; and
a low-pressure supply system which supplies low-pressure hydrogen gas supplied from the injector,
wherein
at least a portion of the low-pressure supply system is a within-end-plate flow passage formed within the end plate, the within-end-plate flow passage being a recess portion or a groove formed within the end plate,
the end plate has a surface area, when observed from a stacking direction of the fuel cell stack, which is larger than a surface area of the fuel cell stack in order for the surface area of the end plate to include an extra region that does not overlap with the surface area of the fuel cell stack, and
the within-end-plate flow passage is formed in its entirety in the extra region of the end plate that does not overlap with the surface area of the fuel cell stack, and
injector holes are formed in the within-end-plate flow passage.

2. The fuel cell system according to claim 1, wherein
the within-end-plate flow passage is formed by covering with a cover the recess portion or the groove formed within the end plate.

3. The fuel cell system according to claim 2, wherein
the end plate is formed of a metal,
the cover is formed of a resin, and
a seal groove which contains a sealing material for bonding the end plate and the cover in a sealing manner is formed in the cover.

4. A fuel cell system, comprising:
a fuel cell stack which generates power through an electrochemical reaction between hydrogen gas and oxidizing gas;
an end plate which is provided on an end portion of the fuel cell stack in a stacking direction thereof;
a high-pressure supply system which supplies high-pressure hydrogen gas supplied from a hydrogen tank;
an injector which decompresses the high-pressure hydrogen gas supplied from the high-pressure supply system; and
a low-pressure supply system which supplies low-pressure hydrogen gas supplied from the injector,
wherein
at least a portion of the low-pressure supply system is a within-end-plate flow passage formed within the end plate,
at least a portion of the high-pressure supply system includes distribution piping systems,
the injector is provided in each of the distribution piping systems,
the end plate has a surface area, when observed from a stacking direction of the fuel cell stack, which is larger than a surface area of the fuel cell stack in order for the surface area of the end plate to include an extra region that does not overlap with the surface area of the fuel cell stack, and
the within-end-plate flow passage is formed in its entirety in the extra region of the end plate that does not overlap with the surface area of the fuel cell stack, and
injector holes are formed in the within-end-plate flow passage.

5. The fuel cell system according to claim 4, wherein
a plurality of injectors provided in the respective distribution piping systems are disposed at different levels with respect to a y axis of the fuel cell system.

6. A fuel cell system, comprising:
a fuel cell stack which generates power through an electrochemical reaction between hydrogen gas and oxidizing gas;
an end plate which is provided on an end portion of the fuel cell stack in a stacking direction thereof;
a high-pressure supply system which supplies high-pressure hydrogen gas supplied from a hydrogen tank;
an injector which decompresses the high-pressure hydrogen gas supplied from the high-pressure supply system; and
a low-pressure supply system which supplies low-pressure hydrogen gas supplied from the injector, wherein
at least a portion of the low-pressure supply system is a within-end-plate flow passage formed within the end plate,
the within-end-plate flow passage is formed by covering with a cover a recess portion or a groove formed in the end plate,
the end plate has a surface area, when observed from a stacking direction of the fuel cell stack, which is larger than a surface area of the fuel cell stack in order for the surface area of the end plate to include an extra region that does not overlap with the surface area of the fuel cell stack, and
the within-end-plate flow passage is formed in its entirety in the extra region of the end plate that does not overlap with the surface area of the fuel cell stack, and
injector holes are formed in the within-end-plate flow passage.

7. A fuel cell system, comprising:
a fuel cell stack which generates power through an electrochemical reaction between hydrogen gas and oxidizing gas;
an end plate which is provided on an end portion of the fuel cell stack in a stacking direction thereof;
a high-pressure supply system which supplies high-pressure hydrogen gas supplied from a hydrogen tank;
an injector which decompresses the high-pressure hydrogen gas supplied from the high-pressure supply system; and
a low-pressure supply system which supplies low-pressure hydrogen gas supplied from the injector,
wherein
at least a portion of the low-pressure supply system is a within-end-plate flow passage formed within the end plate,
the within-end-plate flow passage forms a branched flow passage extending in a vertical direction,
a pressure sensor is provided at a leading end of a portion of the branched flow passage,
the end plate has a surface area, when observed from a stacking direction of the fuel cell stack, which is larger than a surface area of the fuel cell stack in order for the surface area of the end plate to include an extra region that does not overlap with the surface area of the fuel cell stack, and
the within-end-plate flow passage is formed in its entirety in the extra region of the end plate that does not overlap with the surface area of the fuel cell stack, and
injector holes are formed in the within-end-plate flow passage.

8. The fuel cell system according to claim 7, wherein
an outlet side of the injector is connected to the within-end-plate flow passage, and
the pressure sensor is provided at a level, with respect to a y axis of the fuel cell system, which is higher than the injector.

9. A fuel cell system, comprising:
a fuel cell stack which performs generation of power through an electrochemical reaction between hydrogen gas and oxidizing gas;
an end plate which is provided on an end portion of the fuel cell stack in a stacking direction thereof;
a high-pressure supply system which supplies high-pressure hydrogen gas supplied from a hydrogen tank;
an injector which decompresses the high-pressure hydrogen gas supplied from the high-pressure supply system; and
a low-pressure supply system which supplies low-pressure hydrogen gas supplied from the injector,
wherein
at least a portion of the high-pressure supply system is a first within-end-plate flow passage formed within the end plate,
at least a portion of the low-pressure supply system is a second within-end-plate flow passage formed within the end plate,
an inlet port of the first within-end-plate flow passage is formed on one side surface of the end plate, and high-pressure hydrogen flowing out of an outlet port of the first within-end-plate flow passage is supplied to an inlet side of the injector,
the end plate has a surface area, when observed from a stacking direction of the fuel cell stack, which is larger than a surface area of the fuel cell stack in order for the surface area of the end plate to include an extra region that does not overlap with the surface area of the fuel cell stack, and
the within-end-plate flow passage is formed in its entirety in the extra region of the end plate that does not overlap with the surface area of the fuel cell stack, and
injector holes are formed in the within-end-plate flow passage.

10. The fuel cell system according to claim 9, wherein
the first within-end-plate flow passage is a bore formed within the end plate, the bore having an inner diameter which is sequentially reduced from the inlet port toward the outlet port.

* * * * *